United States Patent [19]
Caiozza

[11] Patent Number: 5,879,549
[45] Date of Patent: Mar. 9, 1999

[54] FILTER CARTRIDGE MAGNETIC ATTACHMENT

[76] Inventor: Joseph Caiozza, 321 W. Market St., Long Beach, N.Y. 11561

[21] Appl. No.: 929,335

[22] Filed: Sep. 13, 1997

[51] Int. Cl.$^6$ ..................................................... B01D 35/06
[52] U.S. Cl. ........................................... 210/186; 210/223
[58] Field of Search .................................... 210/222, 223, 210/695, 186; 335/302, 304, 306, 200, 296; 184/6.25

[56] References Cited

U.S. PATENT DOCUMENTS

| | | | |
|---|---|---|---|
| 2,613,246 | 10/1952 | Spodig | 210/222 |
| 2,936,408 | 10/1960 | Bennetot | 335/306 |
| 3,067,366 | 12/1962 | Hofman | 335/306 |
| 3,168,686 | 2/1965 | King et al. | 335/306 |
| 4,575,663 | 3/1986 | Sanders et al. | 335/306 |
| 4,816,796 | 3/1989 | Miyajima et al. | 335/306 |
| 5,510,024 | 4/1996 | Caiozza | 210/186 |
| 5,714,063 | 2/1998 | Brunsting | 210/222 |

*Primary Examiner*—David A. Reifsnyder

[57] ABSTRACT

An improved magnet assembly apparatus is provided for a filter cartridge magnetic attachment such as disclosed in U.S. Pat. No. 5,510,024. With the present invention, the improvement is comprised of a first shunt element attached to a first end of the first particle-attracting magnet. A second shunt element is attached to a first end of the second particle-attracting magnet, and a first or more shunt magnets are connected between the first shunt element and the second shunt element. The first shunt element and the second shunt element are made from iron-containing material. The first particle-attracting magnet has a first longitudinal axis, the second particle-attracting magnet has a second longitudinal. The first longitudinal axis and the second longitudinal axis are parallel, and the first shunt magnet has a first longitudinal shunt axis which is perpendicular to the first longitudinal axis and the second longitudinal axis. With one embodiment of the invention, the first longitudinal axis the second longitudinal axis and the first longitudinal shunt axis lie in a common plane. With another embodiment of the invention, a second shunt magnet is connected between the first shunt element and the second shunt element. With another embodiment of the invention, a third shunt magnet is connected between the first shunt element and the second shunt element. The first particle-attracting magnet, the second particle-attracting magnet, the first shunt magnet, the second shunt magnet, and the third shunt magnet are cylindrical magnets.

12 Claims, 4 Drawing Sheets

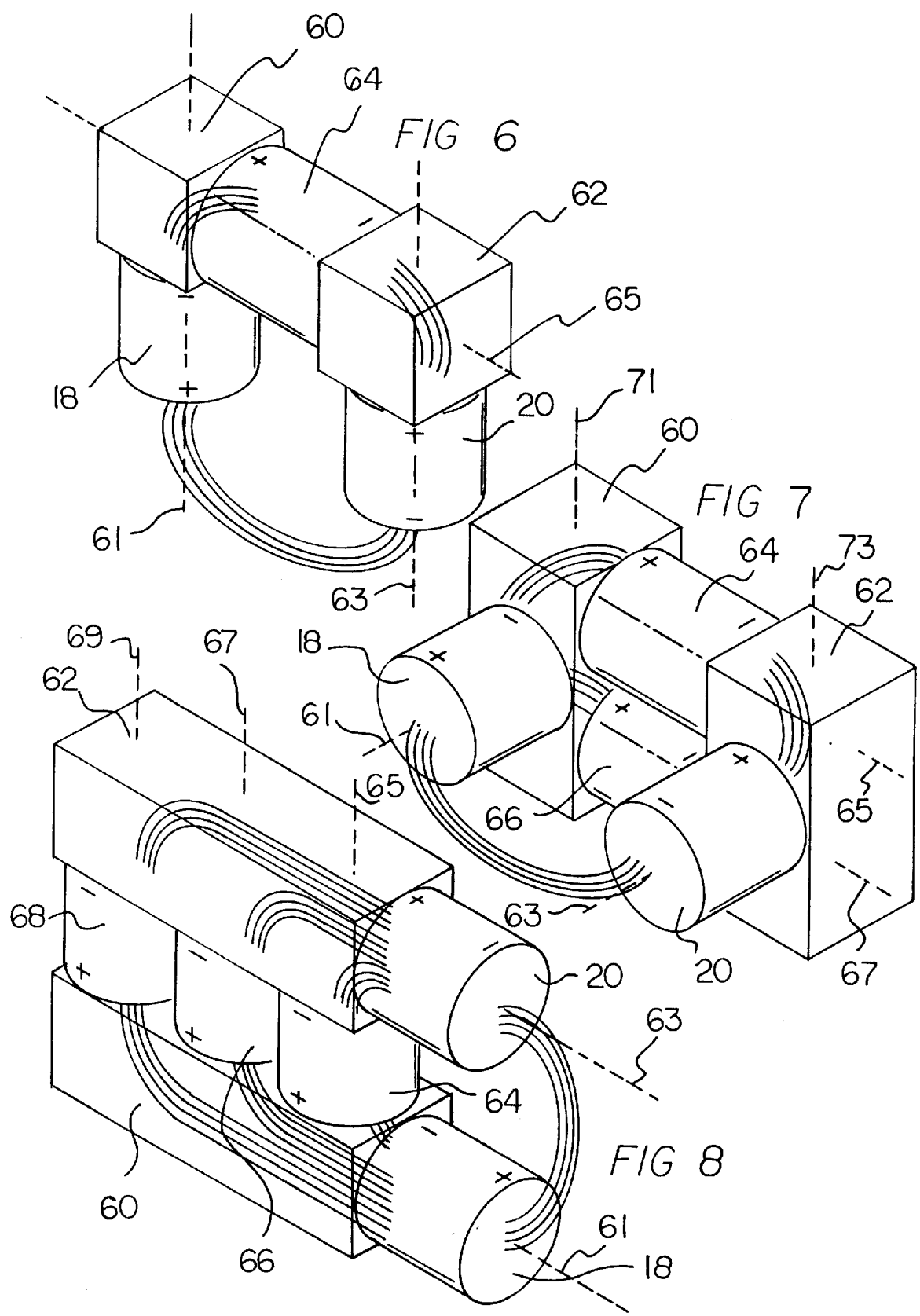

5,879,549

FILTER CARTRIDGE MAGNETIC ATTACHMENT

BACKGROUND OF THE INVENTION

1. Field of the Invention

The present invention relates generally to an improved magnet assembly, and more particularly, to a magnet assembly especially useful as a filtering device or as a filter cartridge magnetic attachment for magnetically collecting metallic particles within a filter.

2. Description of the Prior Art

This patent is an improvement of the filter cartridge magnetic attachment set forth in U.S. Pat. No. 5,510,024 by the same inventor herein. In this respect, U.S. Pat. No. 5,510,024 is incorporated herein by reference.

In U.S. Pat. No. 5,510,024, a first magnet 18 and a second magnet 20 are employed along with either a single shunt 34 or a pair of shunts comprised of a first shunt member 50 and a second shunt member 52. The use of only two magnets and up to two shunts, such as described in U.S. Pat. No. 5,510,024, provides a somewhat limited magnetic configuration that influences the metal particles inside the filter cartridge 14. In this respect, it would be desirable if a filter cartridge magnetic attachment can provide a wide variety of magnetic configurations with a wide variety of magnetic strengths.

In U.S. Pat. No. 5,510,024, the first magnet 18 and the second magnet 20 are spaced apart from one another by a predetermined distance and fit into complementary reception channels in the heat sink 22. To provide additional magnetic configurations, it would be desirable if additional magnets could be configured so that two of the magnets fit into the complementary reception channels in the heat sink 22 as described in U.S. Pat. No. 5,510,024.

In other contexts, throughout the years, a number of innovations have been developed relating to configurations of magnets and shunts, and the following U.S. patents are representative of some of those innovations: U.S. Pat. Nos. 2,613,246, 2,936,408, 3,067,366, 3,168,686, 4,578,663, and 4,816,796. It is noted, however, that none of the configurations of magnets and shunts disclosed in U.S. Pat. Nos. 2,613,246, 2,936,408, 3,067,366, 3,168,686, 4,578,663, and 4,816,796 are suitable for use with the reception channels in the heat sink 22 disclosed in U.S. Pat. No. 5,510,024.

Thus, while the foregoing body of prior art indicates it to be well known to use magnets and shunts in a variety of configurations, the prior art described above does not teach or suggest an improved filter cartridge magnetic attachment which has the following combination of desirable features: (1) provides a wide variety of magnetic configurations with a wide variety of magnetic strengths; and (2) permits additional magnets to be configured so that two of the magnets fit into the complementary reception channels in the heat sink as described in U.S. Pat. No. 5,510,024. The foregoing desired characteristics are provided by the unique improved filter cartridge magnetic attachment of the present invention as will be made apparent from the following description thereof. Other advantages of the present invention over the prior art also will be rendered evident.

SUMMARY OF THE INVENTION

To achieve the foregoing and other advantages, the present invention, briefly described, provides an improved magnet assembly apparatus for a filter cartridge magnetic attachment which includes a magnetic attraction means couplable to an exterior of a filter cartridge for magnetically attracting and retaining metallic particles within the filter cartridge. The magnetic attraction means includes a first particle-attracting magnet and a second particle-attracting magnet which fit into a heat sink which includes magnet retention channels for receiving the first particle-attracting magnet and the second particle-attracting magnet, respectively. The magnet assembly also includes a strap for securing the magnetic attraction means to the filter cartridge.

With the present invention, the improvement is comprised of a first shunt element attached to a first end of the first particle-attracting magnet. A second shunt element is attached to a first end of the second particle-attracting magnet, and a first or more shunt magnets are connected between the first shunt element and the second shunt element. The first shunt element and the second shunt element are made from iron-containing material.

The first particle-attracting magnet has a first longitudinal axis, the second particle-attracting magnet has a second longitudinal. The first longitudinal axis and the second longitudinal axis are parallel, and the first shunt magnet has a first longitudinal shunt axis which is perpendicular to the first longitudinal axis and the second longitudinal axis. With one embodiment of the invention, the first longitudinal axis the second longitudinal axis and the first longitudinal shunt axis lie in a common plane.

With another embodiment of the invention, a second shunt magnet is connected between the first shunt element and the second shunt element. The second shunt magnet has a second longitudinal shunt axis which is parallel to the first longitudinal shunt axis. The first longitudinal axis and the second longitudinal axis lie in a first plane, the first longitudinal shunt axis and the second longitudinal shunt axis lie in a second plane, and the first plane and the second plane are perpendicular to each other. The first shunt element extends longitudinally along a first shunt element axis, the second shunt element extends longitudinally along a second shunt element axis, the first shunt element axis and the second shunt element axis lie in the second plane are perpendicular to the first longitudinal shunt axis and the second longitudinal shunt axis.

With another embodiment of the invention, a third shunt magnet is connected between the first shunt element and the second shunt element. The first particle-attracting magnet, the second particle-attracting magnet, the first shunt magnet, the second shunt magnet, and the third shunt magnet are cylindrical magnets. The third shunt magnet has a third longitudinal shunt axis which is parallel to the first longitudinal shunt axis and the second longitudinal shunt axis. The first longitudinal axis and the second longitudinal axis lie in a first plane, the first longitudinal shunt axis. The second longitudinal shunt axis, and the third longitudinal shunt axis lie in a second plane, and the first plane and the second plane are perpendicular to each other.

With another embodiment of the invention, the first longitudinal axis, the second longitudinal axis, the first longitudinal shunt axis, the second longitudinal shunt axis, and the third longitudinal shunt axis lie in a common plane. The first shunt element extends longitudinally along the first longitudinal axis, the second shunt element extends longitudinally along the second longitudinal axis.

In accordance with another aspect of the invention, a magnet assembly apparatus is provided which includes a first particle-attracting magnet, a second particle-attracting magnet, a first shunt element attached to a first end of the first particle-attracting magnet, a second shunt element attached to a first end of the second particle-attracting magnet, and a first shunt magnet connected between the first shunt element and the second shunt element.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved filter cartridge magnetic attachment which has all of the advantages of the prior art and none of the disadvantages.

It is another object of the present invention to provide a new and improved filter cartridge magnetic attachment which may be easily and efficiently manufactured and marketed.

It is a further object of the present invention to provide a new and improved filter cartridge magnetic attachment which is of durable and reliable construction.

An even further object of the present invention is to provide a new and improved filter cartridge magnetic attachment which is susceptible of a low cost of manufacture with regard to both materials and labor, and which accordingly is then susceptible of low prices of sale to the consuming public, thereby making such improved filter cartridge magnetic attachment available to the buying public.

Still yet a further object of the present invention is to provide a new and improved filter cartridge magnetic attachment which provides a wide variety of magnetic configurations with a wide variety of magnetic strengths.

Still another object of the present invention is to provide a new and improved filter cartridge magnetic attachment that permits additional magnets to be configured so that two of the magnets fit into the complementary reception channels in the heat sink as described in U.S. Pat. No. 5,510,024.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 6 is a perspective view of a first embodiment of the improved filter cartridge magnetic attachment of the invention.

FIG. 7 is a perspective view of a second embodiment of the improved filter cartridge magnetic attachment of the invention.

FIG. 8 is a perspective view of a third embodiment of the improved filter cartridge magnetic attachment of the invention.

DESCRIPTION OF THE PREFERRED EMBODIMENT

Figure 1:
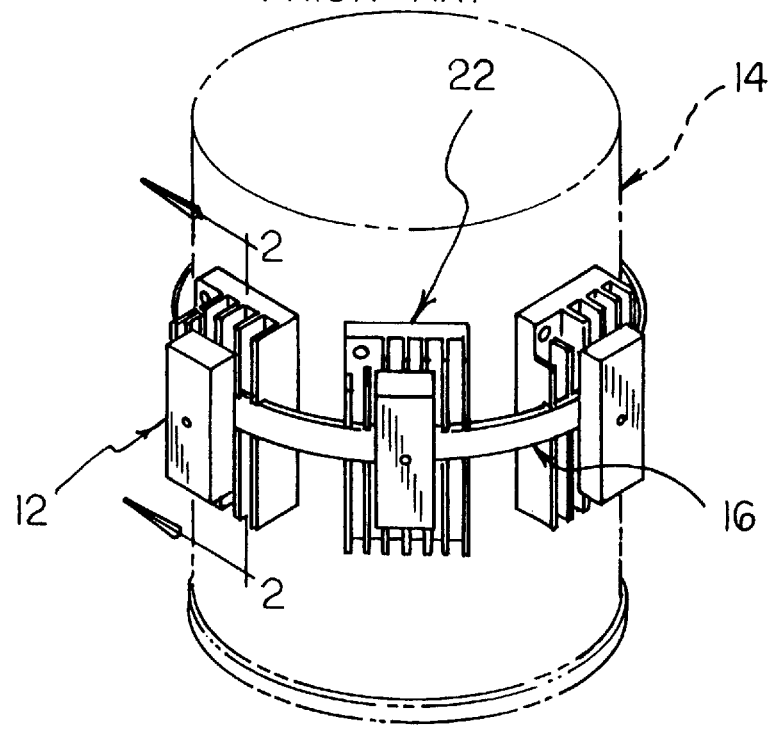
FIG. 1 is an isometric illustration of a prior art filter cartridge magnetic attachment according to U.S. Pat. No. 5,510,024, incorporated herein by reference.
Figure 2:
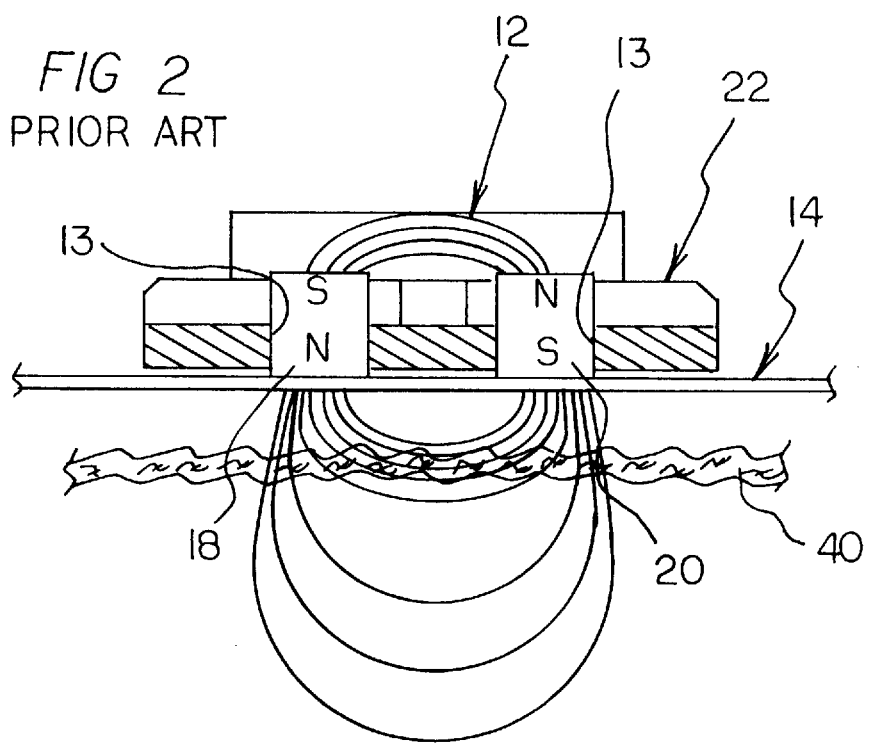
FIG. 2 is a cross-sectional view of the prior art filter cartridge magnetic attachment shown in FIG. 1 taken along line 2—2 thereof.
Figure 3:
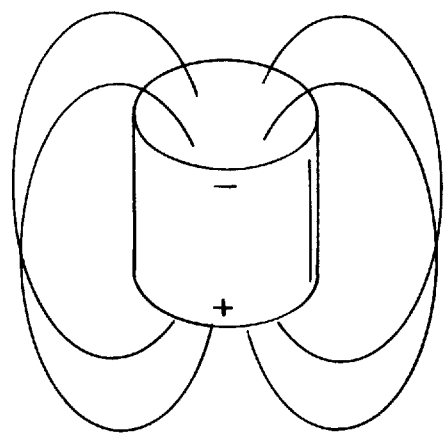
FIG. 3 is a perspective view of a prior art single cylindrical magnet used with the improved filter cartridge magnetic attachment of the invention, wherein magnetic lines of force are shown without the presence of a shunt.
Figure 4:
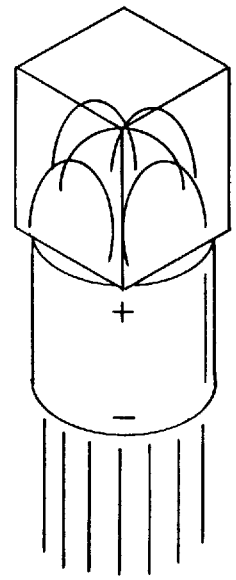
FIG. 4 is a perspective view of the prior art single cylindrical magnet shown in FIG. 3 with a single pole shunt placed on one end of the cylindrical magnet.
Figure 5:
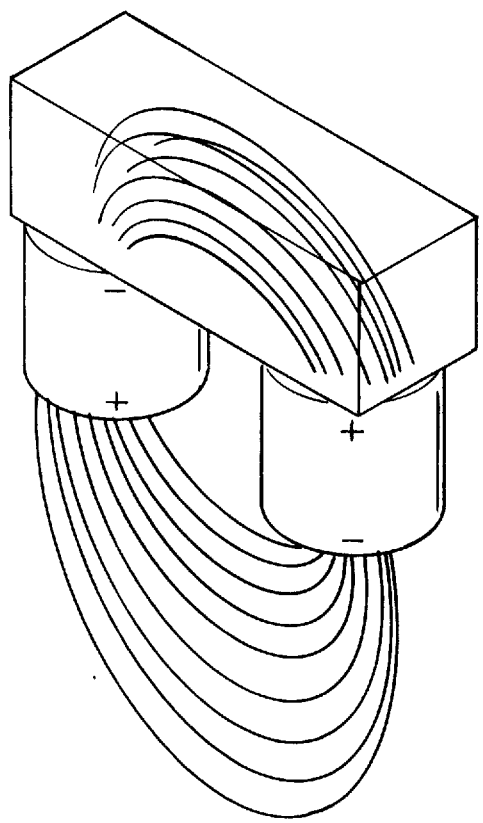
FIG. 5 is a perspective view of two prior art cylindrical magnets, placed with polarities reversed, with a shunt extending between two opposite poles, such as disclosed in U.S. Pat. No. 5,510,024.

With reference to the drawings, a new and improved filter cartridge magnetic attachment embodying the principles and concepts of the present invention will be described.

Turning to FIGS. 6–11, there are shown a number of exemplary embodiments of the improved filter cartridge magnetic attachment of the invention. More specifically, an improved magnet assembly apparatus is provided for a filter cartridge magnetic attachment which includes a magnetic attraction means 12 couplable to an exterior of a filter cartridge 14 for magnetically attracting and retaining metallic particles within the filter cartridge 14. The magnetic attraction means 12 includes a first particle-attracting magnet 18 and a second particle-attracting magnet 20 which fit into a heat sink 22 which includes magnet retention channels 13 for receiving the first particle-attracting magnet 18 and the second particle-attracting magnet 20, respectively. The magnet assembly also includes a strap 16 for securing the magnetic attraction means 12 to the filter cartridge 14.

With the present invention, the improvement is comprised of a first shunt element 60 attached to a first end of the first particle-attracting magnet 18. A second shunt element 62 attached to a first end of the second particle-attracting magnet 20, and a first shunt magnet 64 is connected between the first shunt element 60 and the second shunt element 62. The first shunt element 60 and the second shunt element 62 are made from iron-containing material.

It is noted, with the embodiments of the invention shown in the drawings, the North poles of the respective magnets are represented by a plus (+) sign, and the South poles of the respective magnets are represented by a minus (−) sign.

As shown in FIG. 6, The first particle-attracting magnet 18 has a first longitudinal axis 61, the second particle-attracting magnet 20 has a second longitudinal 63. The first longitudinal axis 61 and the second longitudinal axis 63 are parallel, and the first shunt magnet 64 has a first longitudinal shunt axis 65 which is perpendicular to the first longitudinal axis 61 and the second longitudinal axis 63. The first longitudinal axis 61 the second longitudinal axis 63 and the first longitudinal shunt axis 65 lie in a common plane. The first particle-attracting magnet 18 and the second particle-attracting magnet 20 receive additional magnetic energy from the first shunt magnet 64.

As shown in FIG. 7, second shunt magnet 66 is connected between the first shunt element 60 and the second shunt element 62. The second shunt magnet 66 has a second longitudinal shunt axis 67 which is parallel to the first longitudinal shunt axis 65. The first longitudinal axis 61 and the second longitudinal axis 63 lie in a first plane, the first longitudinal shunt axis 65 and the second longitudinal shunt axis 67 lie in a second plane, and the first plane and the second plane are perpendicular to each other. The first shunt element 60 extends longitudinally along a first shunt element axis 71, the second shunt element 62 extends longitudinally along a second shunt element axis 73, the first shunt element axis 71 and the second shunt element axis 73 lie in the second plane are perpendicular to the first longitudinal shunt axis 65 and the second longitudinal shunt axis 67. The first particle-attracting magnet 18 and the second particle-attracting magnet 20 receive additional magnetic energy from the first shunt magnet 64 and the second shunt magnet 66.

Figure 9:
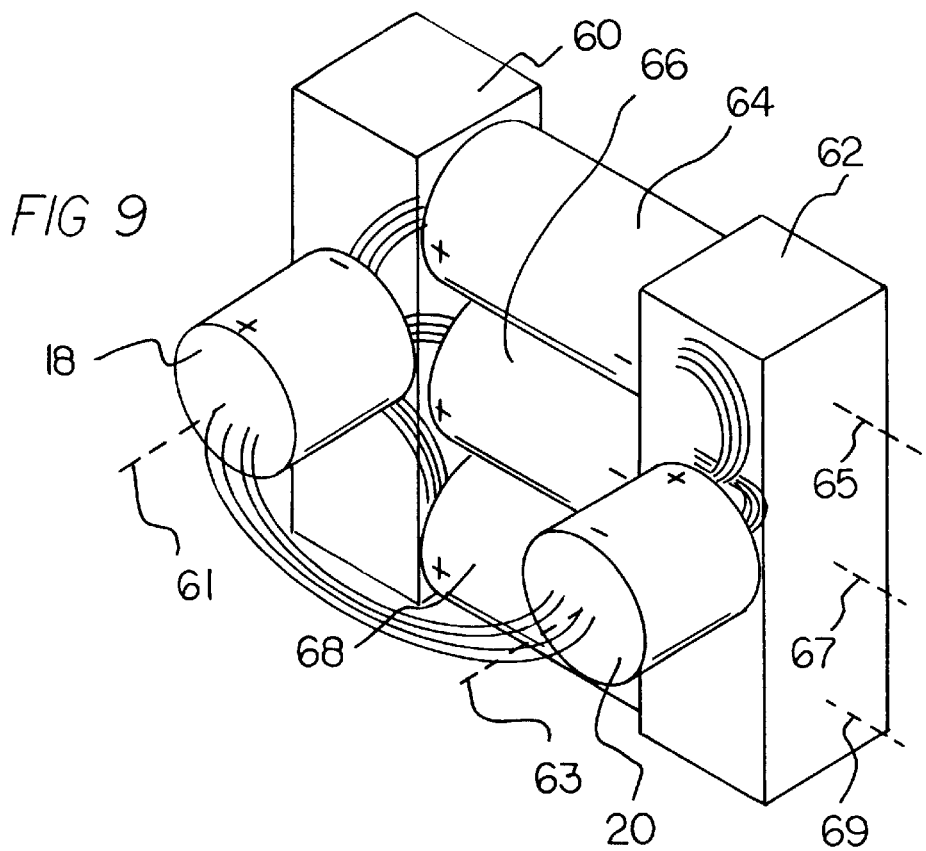
FIG. 9 is a perspective view of a fourth embodiment of the improved filter cartridge magnetic attachment of the invention.
Figure 10:
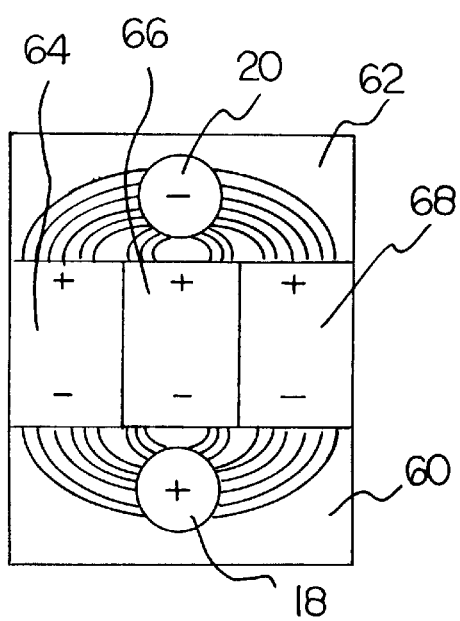
FIG. 10 is a front view of the embodiment of the invention shown in FIG. 9 rotated 90 degrees.
Figure 11:
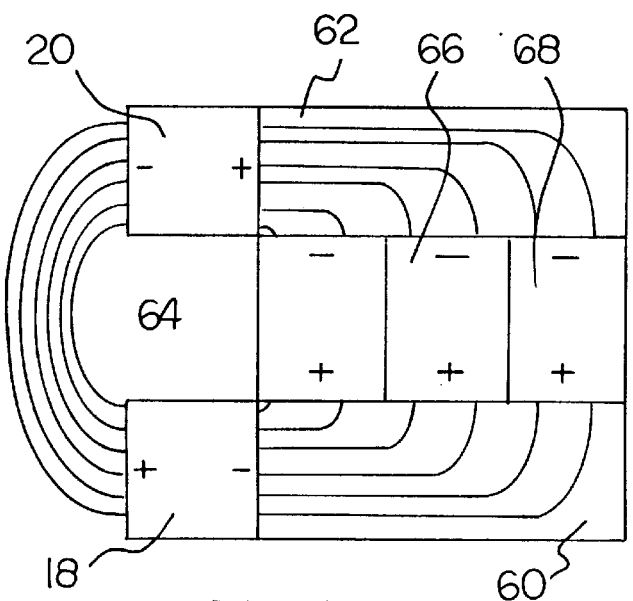
FIG. 11 is a side view of the embodiment of the invention shown in FIG. 8 rotated 180 degrees.

As shown in FIG. 9, third shunt magnet 68 is connected between the first shunt element 60 and the second shunt element 62. The first particle-attracting magnet 18, the second particle-attracting magnet 20, the first shunt magnet 64, the second shunt magnet 66, and the third shunt magnet 68 are cylindrical magnets. The third shunt magnet 68 has a third longitudinal shunt axis 69 which is parallel to the first longitudinal shunt axis 65 and the second longitudinal shunt axis 67. The first longitudinal axis 61 and the second longitudinal axis 63 lie in a first plane, the first longitudinal shunt axis 65. The second longitudinal shunt axis 67, and the third longitudinal shunt axis 69 lie in a second plane, and the first plane and the second plane are perpendicular to each other. The first particle-attracting magnet 18 and the second particle-attracting magnet 20 receive additional magnetic energy from the first shunt magnet 64, the second shunt magnet 66, and the third shunt magnet 68.

As shown in FIG. 8, The first longitudinal axis 61, the second longitudinal axis 63, the first longitudinal shunt axis 65, the second longitudinal shunt axis 67, and the third longitudinal shunt axis 69 lie in a common plane. The first shunt element 60 extends longitudinally along the first longitudinal axis 61, the second shunt element 62 extends longitudinally along the second longitudinal axis 63. The first particle-attracting magnet 18 and the second particle-attracting magnet 20 receive additional magnetic energy from the first shunt magnet 64, the second shunt magnet 66, and the third shunt magnet 68. Moreover, even though the embodiment of the invention shown in FIG. 9 and the embodiment of the invention shown in FIG. 8 both employ three shunt magnets 64, 66, and 68, the resultant magnetic augmentation in FIG. 8 differs from that in FIG. 9 due to the different spatial arrangements of the shunt magnets with respect to the first shunt element 60, the second shunt element 62, the first particle-attracting magnet 18, and the second particle-attracting magnet 20. magnet assembly apparatus includes a first particle-attracting magnet 18. A second particle-attracting magnet 20. A first shunt element 60 attached to a first end of the first particle-attracting magnet 18. A second shunt element 62 attached to a first end of the second particle-attracting magnet 20. A first shunt magnet 64 is connected between the first shunt element 60 and the second shunt element 62.

The first particle-attracting magnet 18 has a first longitudinal axis 61, the second particle-attracting magnet 20 has a second longitudinal 63. The first longitudinal axis 61 and the second longitudinal axis 63 are parallel, and the first shunt magnet 64 has a first longitudinal shunt axis 65 which is perpendicular to the first longitudinal axis 61 and the second longitudinal axis 63. The first longitudinal axis 61 the second longitudinal axis 63 and the first longitudinal shunt axis 65 lie in a common plane. A second shunt magnet 66 is connected between the first shunt element 60 and the second shunt element 62. The second shunt magnet 66 has a second longitudinal shunt axis 67 which is parallel to the first longitudinal shunt axis 65. The first longitudinal axis 61 and the second longitudinal axis 63 lie in a first plane, the first longitudinal shunt axis 65 and the second longitudinal shunt axis 67 lie in a second plane, and the first plane and the second plane are perpendicular to each other. The first shunt element 60 extends longitudinally along a first shunt element axis 71, the second shunt element 62 extends longitudinally along a second shunt element axis 73, the first shunt element axis 71 and the second shunt element axis 73 lie in the second plane are perpendicular to the first longitudinal shunt axis 65 and the second longitudinal shunt axis 67.

A third shunt magnet 68 is connected between the first shunt element 60 and the second shunt element 62. The third shunt magnet 68 has a third longitudinal shunt axis 69 which is parallel to the first longitudinal shunt axis 65 and the second longitudinal shunt axis 67. The first longitudinal axis 61 and the second longitudinal axis 63 lie in a first plane, the first longitudinal shunt axis 65. The second longitudinal shunt axis 67, and the third longitudinal shunt axis 69 lie in a second plane, and the first plane and the second plane are perpendicular to each other. The first longitudinal axis 61, the second longitudinal axis 63, the first longitudinal shunt axis 65, the second longitudinal shunt axis 67, and the third longitudinal shunt axis 69 lie in a common plane.

The first shunt element 60 extends longitudinally along the first longitudinal axis 61, the second shunt element 62 extends longitudinally along the second longitudinal axis 63. The first particle-attracting magnet 18, the second particle-attracting magnet 20, the first shunt magnet 64, the second shunt magnet 66, and the third shunt magnet 68 are cylindrical magnets.

The components of the improved filter cartridge magnetic attachment of the invention can be made from inexpensive and durable magnetic and magnetically conductive materials.

As to the manner of usage and operation of the instant invention, the same is apparent from the above disclosure, and accordingly, no further discussion relative to the manner of usage and operation need be provided.

It is apparent from the above that the present invention accomplishes the objects set forth by providing a new and improved filter cartridge magnetic attachment that is low in cost, relatively simple in design and operation, and which may advantageously be used to provide a wide variety of magnetic configurations with a wide variety of magnetic strengths. Also, with the invention, an improved filter cartridge magnetic attachment is provided which permit to be configured so that two of the magnets fit into the complementary reception channels in the heat sink as described in U.S. Pat. No. 5,510,024.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A magnet assembly apparatus useful as a filter cartridge magnetic attachment which includes a magnetic attraction means couplable to an exterior of a filter cartridge for magnetically attracting and retaining metallic particles within said filter cartridge, wherein the magnetic attraction means includes a first particle-attracting magnet and a second particle-attracting magnet which fit into a heat sink which includes magnet retention channels for receiving the first particle-attracting magnet and the second particle-attracting magnet, respectively, and which includes a strap means for securing the magnetic attraction means to the filter cartridge, the improvement comprising:

a first shunt element attached to a first end of the first particle-attracting magnet, a second shunt element attached to a first end of the second particle-attracting magnet, and a first shunt magnet connected between said first shunt element and said second shunt element.

2. The apparatus of claim 1 wherein:

the first particle-attracting magnet has a first longitudinal axis, the second particle-attracting magnet has a second longitudinal, wherein said first longitudinal axis and said second longitudinal axis are parallel, and said first shunt magnet has a first longitudinal shunt axis which is perpendicular to said first longitudinal axis and said second longitudinal axis.

3. The apparatus of claim 1 wherein said first longitudinal axis said second longitudinal axis and said first longitudinal shunt axis lie in a common plane.

4. The apparatus of claim 1, further including:

a second shunt magnet connected between said first shunt element and said second shunt element.

5. The apparatus of claim 4 wherein said second shunt magnet has a second longitudinal shunt axis which is parallel to said first longitudinal shunt axis.

6. The apparatus of claim 4 wherein:

said first longitudinal axis and said second longitudinal axis lie in a first plane, said first longitudinal shunt axis and said second longitudinal shunt axis lie in a second plane, and said first plane and said second plane are perpendicular to each other.

7. The apparatus of claim 4 wherein:

said first shunt element extends longitudinally along a first shunt element axis, said second shunt element extends longitudinally along a second shunt element axis, said first shunt element axis and said second shunt element axis lie in said second plane are perpendicular to said first longitudinal shunt axis and said second longitudinal shunt axis.

8. The apparatus of claim 4, further including:

a third shunt magnet connected between said first shunt element and said second shunt element.

9. The apparatus of claim 8 wherein said third shunt magnet has a third longitudinal shunt axis which is parallel to said first longitudinal shunt axis and said second longitudinal shunt axis.

10. The apparatus of claim 9 wherein:

said first longitudinal axis and said second longitudinal axis lie in a first plane, said first longitudinal shunt axis, said second longitudinal shunt axis, and said third longitudinal shunt axis lie in a second plane, and said first plane and said second plane are perpendicular to each other.

11. The apparatus of claim 9 wherein said first longitudinal axis, said second longitudinal axis, said first longitudinal shunt axis, said second longitudinal shunt axis, and said third longitudinal shunt axis lie in a common plane.

12. The apparatus of claim 9 wherein:

said first shunt element extends longitudinally along said first longitudinal axis, said second shunt element extends longitudinally along said second longitudinal axis.

* * * * *